(12) United States Patent
Kaye

(10) Patent No.: US 12,010,985 B2
(45) Date of Patent: Jun. 18, 2024

(54) RODENT TRAP AND RODENT MANAGEMENT

(71) Applicant: Brandenburg (UK) Limited, West Midlands (GB)

(72) Inventor: Mathew Varghese Kaye, West Midlands (GB)

(73) Assignee: CAUCUS LIMITED (GB)

( * ) Notice: Subject to any disclaimer, the term of this patent is extended or adjusted under 35 U.S.C. 154(b) by 265 days.

(21) Appl. No.: 17/287,511

(22) PCT Filed: Oct. 21, 2019

(86) PCT No.: PCT/IB2019/058945
§ 371 (c)(1),
(2) Date: Apr. 21, 2021

(87) PCT Pub. No.: WO2020/084439
PCT Pub. Date: Apr. 30, 2020

(65) Prior Publication Data
US 2021/0392871 A1 Dec. 23, 2021

(30) Foreign Application Priority Data
Oct. 22, 2018 (GB) .................................. 1817178

(51) Int. Cl.
*A01M 23/38* (2006.01)
*A01M 23/16* (2006.01)
(52) U.S. Cl.
CPC ............. *A01M 23/38* (2013.01); *A01M 23/16* (2013.01)

(58) Field of Classification Search
CPC ....................................................... A01M 23/38
(Continued)

(56) References Cited

U.S. PATENT DOCUMENTS

| 1,045,676 A | 11/1912 | Robert | |
| 4,074,456 A * | 2/1978 | Tidwell | A01M 1/2011 43/112 |

(Continued)

FOREIGN PATENT DOCUMENTS

| CA | 2544563 A1 | 10/2007 |
| CH | 85344 A * | 6/1920 |

(Continued)

OTHER PUBLICATIONS

English abstract for CN-202489112.

*Primary Examiner* — Darren W Ark
(74) *Attorney, Agent, or Firm* — Fishman Stewart PLLC

(57) ABSTRACT

A rodent trap and a method of managing rodent control using a rodent trap are disclosed. The rodent trap includes a housing including a kill compartment that houses at least one electric shocking device for shocking a rodent, an entrance tunnel at a first end of the kill compartment, and a door at a second end of the kill compartment. The entrance tunnel is of a length and shape so as to prevent an operative from accidentally inserting a hand into the kill compartment. The entrance tunnel includes a sensor. The trap further includes a power source, an interface, and a printed circuit board for determining that the shocking device has triggered, that the rodent has not departed from the housing within a defined time period, and that facilitates communication sending a signal remotely.

20 Claims, 3 Drawing Sheets

(58) Field of Classification Search
USPC .................................................. 43/98, 99
See application file for complete search history.

(56) References Cited

U.S. PATENT DOCUMENTS

| | | | | |
|---|---|---|---|---|
| 4,497,130 | A * | 2/1985 | Fitzgerald | A01M 23/38 43/98 |
| 5,953,853 | A * | 9/1999 | Kim | A01M 23/38 43/61 |
| 6,735,899 | B1 * | 5/2004 | Anderson | A01M 23/04 43/98 |
| 6,807,767 | B1 * | 10/2004 | Schade | A01M 23/30 43/77 |
| 6,836,999 | B2 * | 1/2005 | Rich | A01M 19/00 43/98 |
| 6,863,999 | B1 * | 3/2005 | Sudre | F01D 5/288 416/241 B |
| 8,024,888 | B2 * | 9/2011 | Wetzel | A01M 31/002 43/99 |
| 9,374,993 | B2 * | 6/2016 | Smith | A01M 23/36 |
| 10,143,193 | B2 * | 12/2018 | Noe | G01J 5/0025 |
| 10,548,307 | B2 * | 2/2020 | Hertzler | A01M 23/18 |
| 11,147,262 | B2 * | 10/2021 | Liu | A01M 23/16 |
| 11,464,222 | B2 * | 10/2022 | Chen | A01M 23/38 |
| 2006/0123693 | A1 * | 6/2006 | Muller | A01M 31/002 43/99 |
| 2007/0245617 | A1 * | 10/2007 | Deibert | A01M 23/10 43/72 |
| 2009/0102600 | A1 * | 4/2009 | Noe | A01M 31/002 340/3.1 |
| 2009/0172995 | A1 * | 7/2009 | Wetzel | A01M 23/38 43/98 |
| 2009/0192763 | A1 * | 7/2009 | Gardner, Jr. | A01M 1/026 702/187 |
| 2009/0313880 | A1 * | 12/2009 | Bucher | A01M 23/14 43/99 |
| 2010/0134301 | A1 * | 6/2010 | Borth | H04W 76/10 340/573.2 |
| 2010/0146839 | A1 * | 6/2010 | Cruz | A01M 23/14 43/99 |
| 2010/0236131 | A1 * | 9/2010 | Rivera | A01M 31/002 43/98 |
| 2010/0236132 | A1 * | 9/2010 | Rivera | A01M 23/38 43/98 |
| 2014/0013649 | A1 * | 1/2014 | Rivera | A01M 23/38 43/99 |
| 2015/0150236 | A1 * | 6/2015 | Grant | A01M 23/38 43/99 |
| 2018/0139949 | A1 * | 5/2018 | Liu | A01M 99/00 |
| 2019/0029246 | A1 * | 1/2019 | Kletzli | A01M 23/16 |
| 2019/0246621 | A1 * | 8/2019 | Kletzli | A01M 23/38 |
| 2019/0364876 | A1 * | 12/2019 | Kletzli | A01M 23/08 |
| 2020/0005626 | A1 * | 1/2020 | Triventi | G08B 29/185 |
| 2020/0187486 | A1 * | 6/2020 | Chen | A01M 23/38 |
| 2020/0253186 | A1 * | 8/2020 | Files | A01M 19/00 |
| 2020/0253187 | A1 * | 8/2020 | Files | A01M 19/00 |
| 2021/0185998 | A1 * | 6/2021 | Siler | A01M 23/16 |
| 2021/0298316 | A1 * | 9/2021 | Hurnik | A22B 3/06 |
| 2022/0159940 | A1 * | 5/2022 | Walstad | A01M 23/38 |
| 2023/0042831 | A1 * | 2/2023 | Shah | A01M 31/002 |
| 2023/0061104 | A1 * | 3/2023 | Liu | A01M 23/38 |
| 2023/0064810 | A1 * | 3/2023 | Feng | A01M 23/16 |
| 2023/0066844 | A1 * | 3/2023 | Chen | A01M 23/38 |

FOREIGN PATENT DOCUMENTS

| | | | | |
|---|---|---|---|---|
| CN | 202489112 | U * | 10/2012 | |
| CN | 213486605 | U * | 6/2021 | ........... A01M 23/02 |
| CN | 114747563 | A * | 7/2022 | |
| DE | 338762 | C * | 7/1921 | |
| DE | 9413200 | U1 * | 12/1994 | |
| DE | 19954142 | C2 * | 3/2002 | ........... A01M 23/20 |
| EP | 3420816 | A1 * | 1/2019 | ........... A01M 23/16 |
| GB | 2354693 | A * | 4/2001 | ........... A01M 23/38 |
| GB | 2550967 | A * | 12/2017 | ........... A01M 1/026 |
| GB | 2551053 | A * | 12/2017 | ........... A01M 1/026 |
| GB | 2580831 | A * | 7/2020 | ........... A01M 1/026 |
| GB | 2585277 | A * | 1/2021 | ........... A01M 1/026 |
| JP | 2020054290 | A * | 4/2020 | |
| JP | 6710203 | B2 * | 6/2020 | ........... A01M 1/026 |
| KR | 20140119924 | A * | 10/2014 | |
| WO | WO-2007/068971 | | 6/2007 | |
| WO | WO-2007068971 | A1 * | 6/2007 | ........... A01M 23/18 |
| WO | WO-2007123755 | A2 * | 11/2007 | ........... A01M 23/38 |
| WO | WO-2009088966 | A1 * | 7/2009 | ........... A01M 23/38 |
| WO | WO-2013/177652 | | 12/2013 | |
| WO | WO-2016028219 | A1 * | 2/2016 | ........... A01M 19/00 |
| WO | WO-2017208068 | A1 * | 12/2017 | ........... A01M 1/026 |
| WO | WO-2020010078 | A1 * | 1/2020 | ........... A01M 23/38 |
| WO | WO-2020192884 | A1 * | 10/2020 | ........... A01M 23/38 |
| WO | WO-2021048543 | A1 * | 3/2021 | ........... A01M 23/08 |
| WO | WO-2021171319 | A1 * | 9/2021 | ........... A01M 23/08 |

* cited by examiner

RODENT TRAP AND RODENT MANAGEMENT

This application claims priority to International Patent Application No. PCT/IB2019/058945 filed Oct. 21, 2019, which also claims priority to Great Britain Patent Application GB 1817178.5 filed Oct. 22, 2018, the contents of each of which is hereby incorporated by reference in its entirety.

TECHNICAL FIELD

This invention relates to a rodent trap, and more particularly to a trap that delivers an electric shock to kill the rodent. It also relates to improved methodology for rodent management.

BACKGROUND

The prior art includes various rodent traps, including traps that deliver an electric shock designed to kill the rodent, typically a rat.

These include WO2013177652, CN202489112, CA2544563 and U.S. Pat. No. 1,045,676.

With the spread of hantaviruses, and the risks to human health associated therewith the effective management of rodents is becoming even more important.

A problem with rodent traps, which shock is:
i) They can be triggered accidentally, potentially shocking operators; and
ii) After triggering and killing a rodent, a dead rodent may be left for weeks inside the trap until an operative checks' the trap, thereby causing potential health issues.

An object of the present invention is to provide a provide an improved rodent trap, and methodology which addresses these and other problems.

SUMMARY

In accordance with a first aspect of the present inventions there is provided a rodent trap comprising a housing comprising a kill compartment, housing at least one electric shocking device, in which a rodent is shocked, an entrance tunnel at a first end of the kill compartment, and a door at a second end of the kill compartment remote from the first end, which entrance tunnel is of a length and shape so as to prevent an operative accidentally inserting a hand into the kill compartment.

In a preferred embodiment there is provided a rodent trap comprising a housing comprising a kill compartment, housing at least one electric shocking device, in which a rodent is shocked, an entrance tunnel at a first end of the kill compartment, and a door at a second end of the kill compartment remote from the first end, which entrance tunnel is of a length and shape so as to prevent an operative accidentally inserting a hand into the kill compartment wherein the entrance tunnel comprises a sensor, and the trap comprises a power source, an interface and printed circuit board for determining that an electric shocking device has triggered, that the rodent has not subsequently departed from the trap within a defined time period, and which facilitates communication, sending a signal remotely.

The provision of an entrance tunnel, of a length of at least 10 cm, prevents an operative or e.g. child, inadvertently touching the shocking device.

It also allows for the inclusion of a sensor, particularly one of a type disclosed in WO2017/208068, which disclosure is incorporated by reference, enabling detection of entry and exit. Such an arrangement facilitates the methodology of the second aspect of the invention.

In a preferred embodiment the kill component includes one or a plurality of shocking plates. In the embodiment illustrated there are three plates.

The at least one electric shocking device is preferably disposed on a floor of the kill compartment and is most preferably triggered by a rodent making contact with the plate.

Preferably, the at least one electric shocking device is electrically connected to a local power source, such as one or more batteries.

Preferably the entrance tunnel comprises a sensor to detect entry (and possibly exit) of the rodent. Most preferably the sensor is a capacitance sensor, more preferably still a fringe capacitance sensor, which sensor is able to send data directly or indirectly to a pest control agent, facilitating good trap management.

Thus, the sensor will have associated with it a sensor board and, optionally, an interface board for gathering and responding to signals obtained at the sensor and the kill plates and associated high voltage board.

Preferably the sensor is positioned above the tunnel, being mounted on a support and sandwiched between the support and a housing or casing member, such that it is protected.

Preferably the trap comprises a circuit board or interface ensuring communication between and external of the electronic components of the trap.

To facilitate the methodology according to the second aspect of the invention, the trap can send a signal remotely to indicate a rodent has entered the trap. It can further send a signal remotely to indicate that an electric shocking device has triggered a shock. Furthermore, it can determine and signal that the rodent hasn't left the trap, within a given time frame subsequent to shocking, thereby confirming the trap needs attending to remove a dead rodent.

This methodology helps overcome two problems—firstly ensuring a trap is attended to once it is triggered, and secondly, avoiding the cost of a wasted trip by filtering out false positives by determining that a rat has both entered, ahead of triggering, and not subsequently left the trap.

A further problem the trap addresses is ensuring the operative can bait the trap safely.

In this regard the inner surface of the door comprises a bait holder and, in order, to bait the trap the door must be opened. Since the door provides access to the kill compartment there is a risk of the operator receiving an electric shock.

To address this the rodent trap is designed such that the opening of the door electrically disconnects the trap. This is achieved by having an electrical connection on the locking member of the door, such that when the door is closed a circuit is formed but when it is open the circuit to the shocking device is broken.

The door is connected to the kill compartment in a hinged manner and is positioned over the second end of the kill compartment, which second end is remote from the first end from which the tunnel entrance extends.

The rodent trap may comprise one or a plurality of printed circuit boards (pcb's) including one to manage the high voltage shocking, one to manage the sensor and optionally an interface. The pcb's comprise a signalling device for sending data from the trap either directly, or indirectly, to a pest control operative.

Preferably the tunnel is at least 10 cm in length such that fingers can't accidentally be inserted through the opening and reach into, and make contact with, the shocking device. More preferably it is of a length of between 10 cm and 20 cm in length.

Preferably, to simplify construction and assembly the trap comprises a support which sits over the kill compartment and entrance tunnel between a lower housing or casing member and an upper housing or casing member.

The support holds in position the sensor pad, sensor board, an interface board if required, high voltage board and batteries.

According to a second aspect of the present invention there is provided a method for managing rodent control more accurately and efficiently, which method comprises the use of a rodent trap according to a first aspect of the present invention and the steps of:
 i) identifying and reporting the entrance of a rodent into the trap;
 ii) separately, and independently, reporting the triggering of a shocking device; and
 iii) confirming extermination, by reporting no subsequent departure of the rodent from the trap within a defined time-period.

Preferably the trap sends an instruction remotely to a pest operative.

In a preferred embodiment there is provided a method for managing rodent control which method comprises the use of a rodent trap and the steps of:
 i) Identifying entrance of a rodent into the trap using a sensor (30);
 ii) Separately and independently recording the triggering of a shocking device (16); and
 iii) Confirming extermination by reporting the entrance, triggering of the shocking device and no subsequent departure of the rodent from the trap within a defined time-period (t), to a pest operative.

BRIEF DESCRIPTION OF THE DRAWINGS

Embodiments of the invention are further described hereinafter with reference to the accompanying drawings, in which.

DETAILED DESCRIPTION

Figure 1:
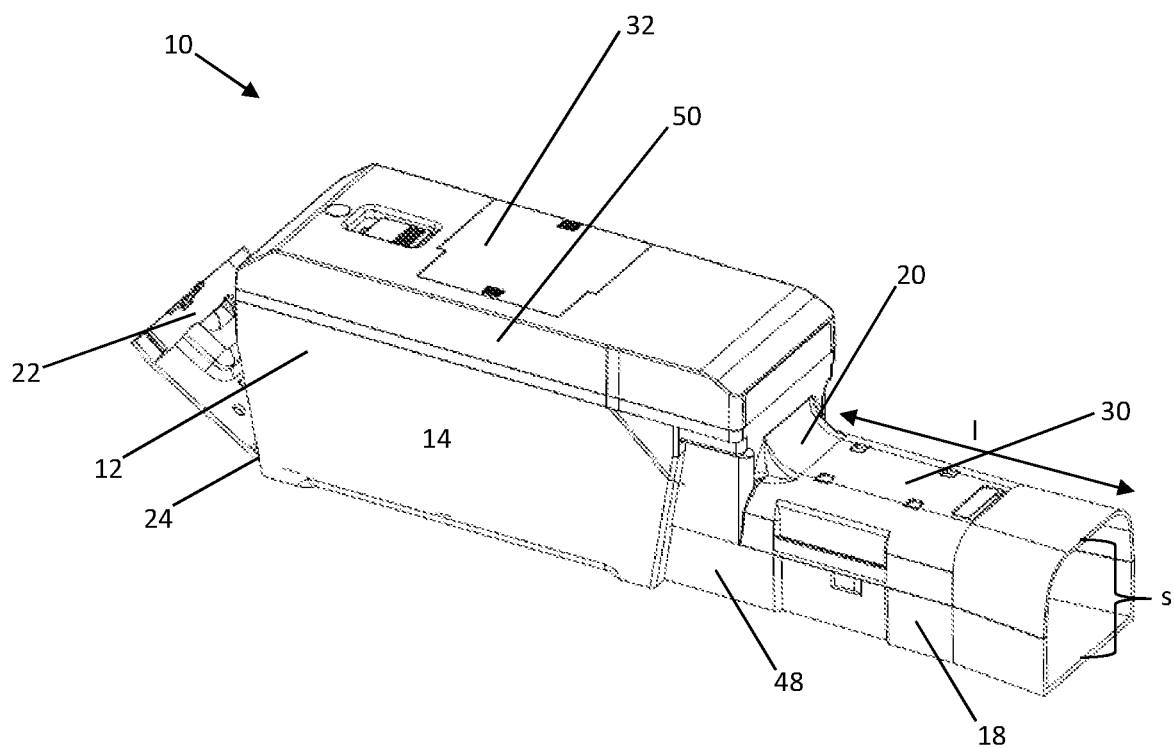
FIG. 1 is a perspective view of a rodent trap according to the first aspect of the invention.
Figure 2A:
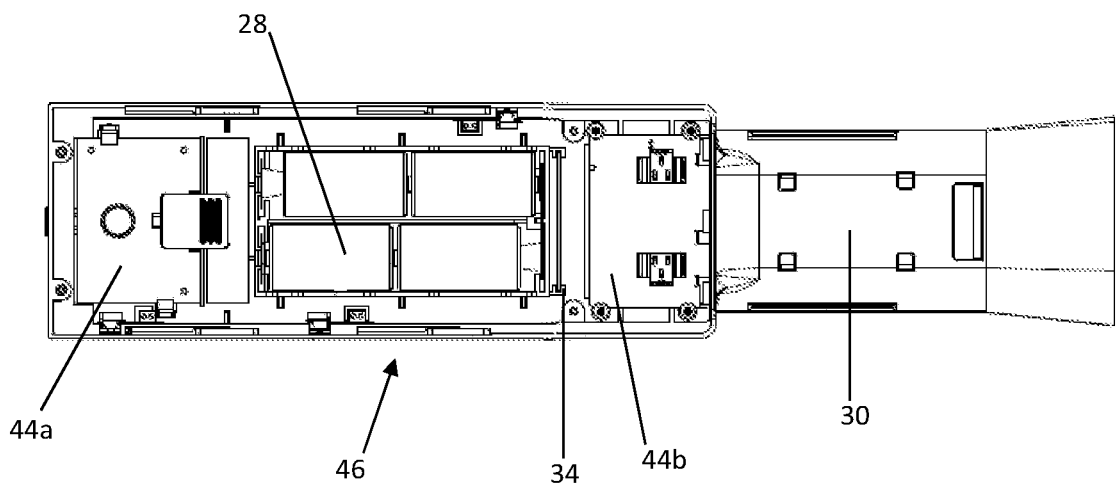
FIG. 2A is a view from above, of the rodent trap of FIG. 1 with the upper housing or casing removed.
Figure 2B:
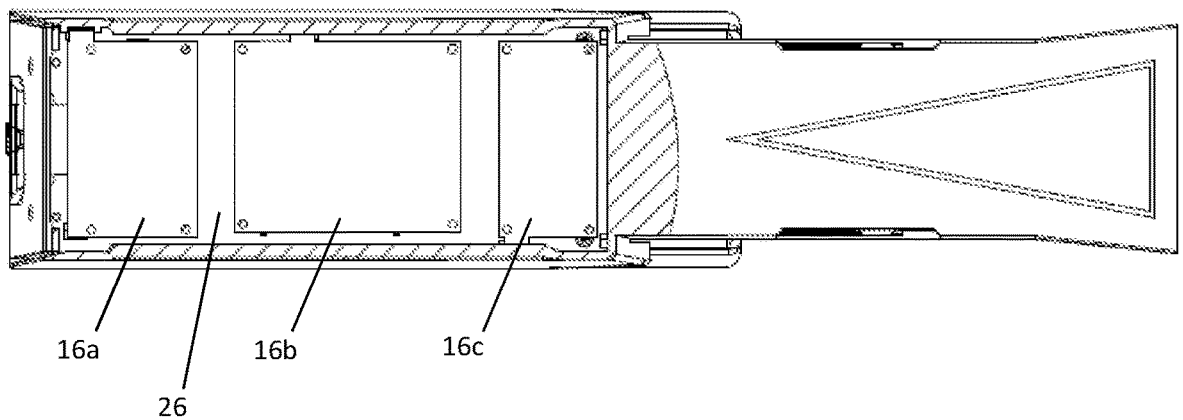
FIG. 2B is a view from above, of the rodent trap of FIG. 1 with the upper housing or casing and support removed.

FIGS. 1, 2A and 2B illustrates one embodiment of a rodent trap (10) according to the first aspect of the invention. The trap comprises a housing (12) including a kill compartment (14) containing at least one electric shocking device (16a, 16b, 16c), in which a rodent (not shown) is shocked. The rodent enters the trap via an entrance tunnel (18) provided at a first end (20) of the kill compartment (14). At a second end (24) of the kill compartment (14), remote from the first end (20), is a door (22) which opens and closes to allow the trap to be baited. The entrance tunnel (18) is of a length (l) and shape (s) to prevent an operative (not shown) accidentally inserting a hand or a finger into the kill compartment (14).

The electric shocking device most preferably takes the form of a plurality of, in this case three, shocking plates (16a, 16b, 16c). These are positioned on the floor (26) of the kill compartment and are electrically connected to a power source (28) and controls in printed circuit boards (44a; 44b), including a high voltage board (44a) and sensor board (44b), fitted on a support (46)—see FIG. 2A.

The electric shocking device (16) is electrically connected to a power source (28) which take the form of batteries (omitted for clarity) which are fitted on the support (46).

The support (46) also retains a sensor (30) which is of the type disclosed in WO2017/208068, and is a fringe capacitance sensor, and is able to not only identify the presence of a rodent, but also determine and signal its direction of movement. The sensor has associated with it a pcb (44b) and is linked to the other electrical components including the high voltage board (44a) optionally by an interface (34).

The sensor (30) is located and positioned above the tunnel (18) and as stated above is able to determine not only the presence of e.g. a rat, discriminating it from other pests (of a different size or e.g. leaves) and its direction of travel—entry and exit or entry and death (by virtue of the fact it hasn't exited).

The sensor unit includes not only the sensor pad (30) but a sensor board (44b) and is able to collect and signal data directly and communicate with other components of the trap, for example the high voltage board (44a) via its' circuit board or an interface (34).

Thus, the trap is able to send a signal remotely to indicate a rodent has entered the trap, send a signal remotely to indicate that an electric shocking device (16) has triggered a shock, and further confirm that the rodent has not departed the trap within a given period.

Alternatively, the data can be collated, and a single signal sent indicating a rodent has been killed and the trap needs attending too.

Figure 3:
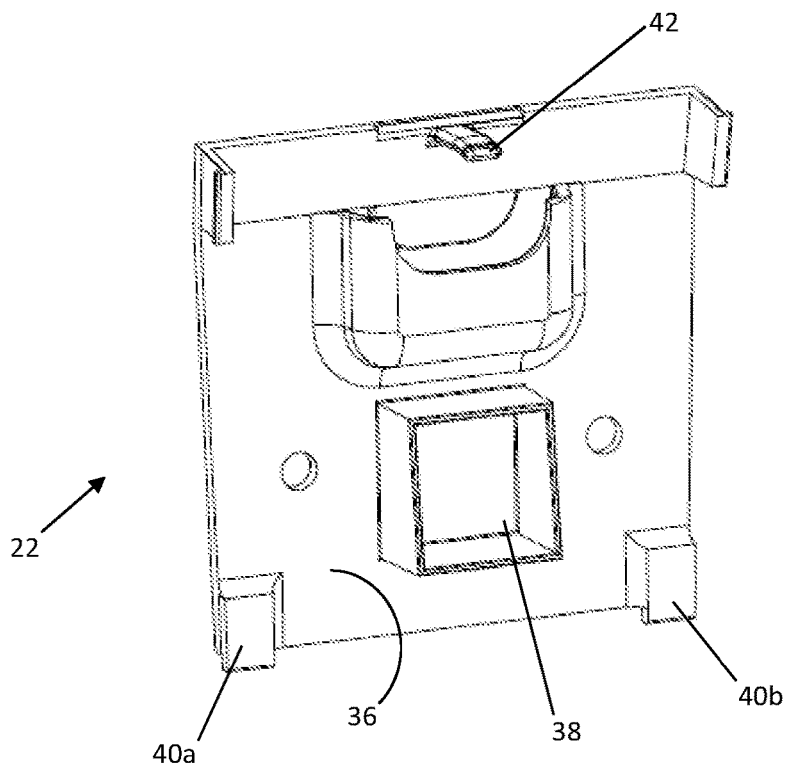
FIG. 3 is a detailed view of the door, of the rodent trap of FIG. 1.

Turning to FIG. 3 the door (22) has an inner surface (36) having a bait holder (38) in the form of a receptacle. The door is connected to the kill compartment (14) in a hinged manner (40a, 40b). The door has a locking member (42) for locking the door (22) over the second end (24) of the kill compartment (14). The locking member (42) comprises an electrical contact such that the opening of the door (22) electrically disconnects the trap such that, if the shocking device is accidentally touched, the toucher will not be shocked.

Another important aspect of the invention is the provision of an entrance tunnel (18) which is of a length (l) and shape (s) such that, for example, stray fingers can't reach the kill compartment.

As illustrated in FIG. 1 the tunnel is at least 10 cm in length (l), and typically between 10 cm and 20 cm in length.

To facilitate simple manufacture and assembly, and in order to ensure optimal positioning of the sensor (30) and circuitry, the trap comprises a support (46) (FIG. 4A) which sits over the kill compartment (14) and entrance tunnel (18) between a lower housing or casing member (48) (FIG. 4B) and an upper housing or casing member (50) (Compare to FIG. 1) which comprises a removable panel (32) to allow the batteries (28) to be accessed.

Figure 4A:
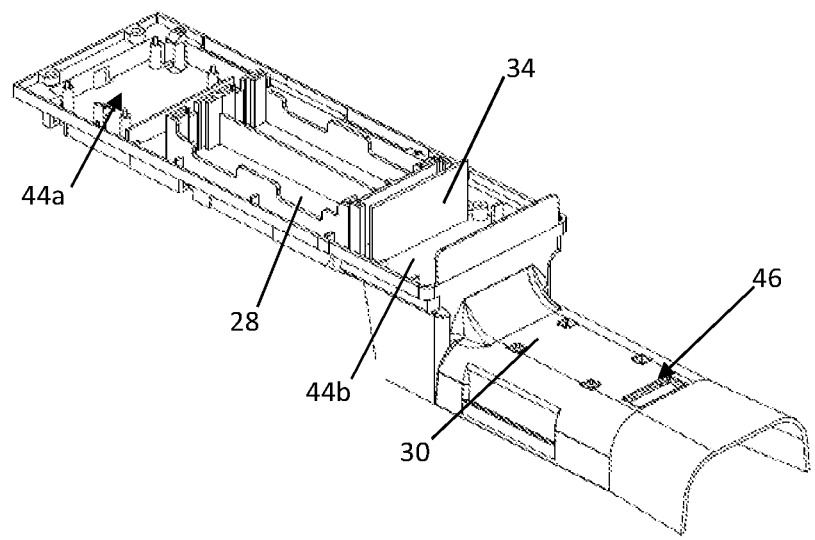
FIGS. 4A and 4B show respectively the support, and lower housing or casing member of the rodent trap of FIG. 1.
Figure 4B:
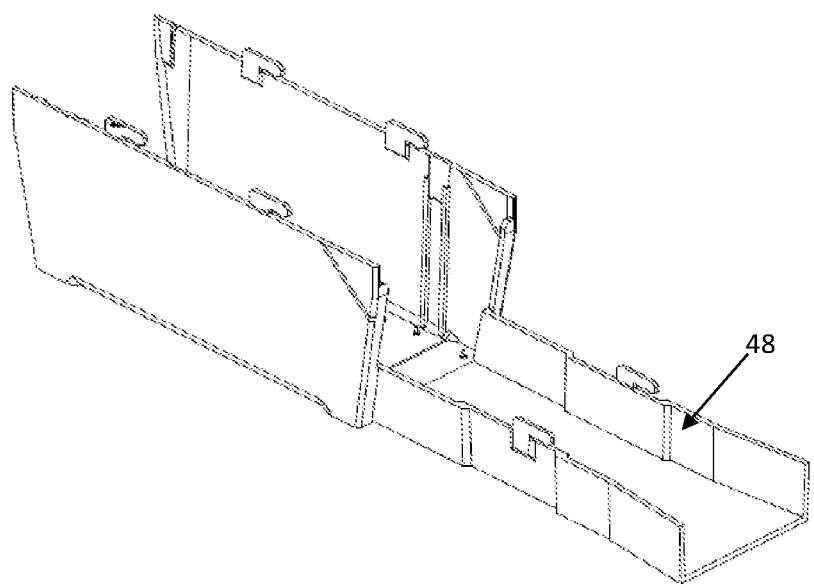

The support, as illustrated in FIG. 4A, allows effective positioning and integration of the pcb's (44a, 44b), batteries (28), an interface (34) if required and sensor (30) at the positions indicated (the actual components are omitted for clarity).

The rodent trap described is a "smart" trap and can be used to better manage rodent control. In use the internal operating system enables the trap to perform the steps of:
  i) Identifying and, optionally, reporting the entrance of a rodent into the trap;
  ii) Separately and independently, optionally, reporting the triggering of a shocking device (16); and
  iii) Confirming extermination by reporting no subsequent departure of the rodent from the trap, within a defined time-period (t).

The trap is able to send an instruction remotely to a data centre and/or a pest control operator.

The invention claimed is:

1. A rodent trap, comprising:
    a housing including a kill compartment, housing at least one electric shocking device, in which a rodent is shocked, an entrance tunnel at a first end of the kill compartment comprising a sensor and a door at a second end of the kill compartment remote from the first end, the entrance tunnel being of a length and a shape so as to prevent an operative accidentally inserting a hand into the kill compartment, wherein the entrance tunnel further comprises a power source, one or a plurality of printed circuit boards comprising a signalling device and an interface, the interface facilitating communication such that the trap:
    i) identifies, using the sensor, and reports, via the signalling device and the interface, the entrance of a rodent into the trap;
    ii) separately and independently reports, via the signalling device and the interface, the triggering of the at least one electric shocking device; and
    iii) confirms extermination by reporting, via the signalling device and the interface, that the rodent has not subsequently departed from the housing within a defined time period, and
    either sends data pertaining to i) to iii) remotely to a data centre or pest control operator individually or collated.

2. A rodent trap as claimed in claim 1 wherein the at least one electric shocking device includes one or a plurality of shocking plates.

3. A rodent trap as claimed in 2 wherein the one or a plurality of shocking plates includes at least two shocking plates.

4. A rodent trap as claimed in claim 3 wherein the at least two shocking plates includes three shocking plates.

5. A rodent trap as claimed in claim 1 wherein the at least one electric shocking device is disposed on a floor of the kill compartment.

6. A rodent trap as claimed in claim 1 wherein the at least one electric shocking device is electrically connected to the power source.

7. A rodent trap as claimed in claim 6 wherein the power source is at least one battery.

8. A rodent trap as claimed in claim 1 wherein the sensor is a capacitance sensor.

9. A rodent trap as claimed in claim 7 wherein the sensor is positioned above the entrance tunnel.

10. A rodent trap as claimed in claim 1 wherein an inner surface of the door comprises a bait holder.

11. A rodent trap as claimed in claim 1 wherein the door is connected to the kill compartment in a hinged manner.

12. A rodent trap as claimed in claim 1 wherein an opening of the door electrically disconnects the trap.

13. A rodent trap as claimed in claim 1 further comprising a locking member for locking the door over the second end of the kill compartment.

14. A rodent trap as claimed in claim 1 wherein the one or the plurality of printed circuit boards further comprises a high voltage board linked to the interface for management of high voltage shocking.

15. A rodent trap as claimed in claim 1 wherein the entrance tunnel is at least 10 cm in length.

16. A rodent trap as claimed in claim 15 wherein the entrance tunnel is between 10 cm and 20 cm in length.

17. A rodent trap as claimed in claim 1 further comprising a support that sits over the kill compartment and the entrance tunnel between a lower housing or casing member and an upper housing or casing member.

18. A rodent trap as claimed in claim 17 wherein the support is structured and arranged to retain the one or the plurality of printed circuit boards, the power source and the sensor.

19. A method for managing rodent control which method comprises the use of a rodent trap and the steps of:
    i) providing the rodent trap as claimed in claim 1;
    ii) identifying entrance of a rodent into the trap using the sensor;
    iii) separately and independently recording the triggering of the at least one shocking device; and
    iv) confirming extermination of the rodent by reporting the entrance, the triggering of the at least one shocking device and no subsequent departure of the rodent from the trap within a defined time period, to a pest operative.

20. A method as claimed in claim 19, further comprising electrically disconnecting the at least one shocking device in response to opening the door of the trap.

* * * * *